May 17, 1966  A. E. MAINE  3,252,074
D.C.-A.C. INVERTERS
Filed March 9, 1962  2 Sheets-Sheet 1

Inventor:
Arthur Edward Maine
By Ken W. Flocks
Attorney

United States Patent Office 3,252,074
Patented May 17, 1966

3,252,074
D.C.-A.C. INVERTERS
Arthur Edward Maine, Agincourt, Ontario, Canada, assignor to The De Havilland Aircraft Company Limited, a company of Great Britain
Filed Mar. 9, 1962, Ser. No. 178,726
Claims priority, application Great Britain, Mar. 10, 1961, 8,919/61
3 Claims. (Cl. 321—45)

This invention relates to improvements in D.C.-A.C. inverters.

It is an object of the present invention to provide an improved D.C.-A.C. inverter which shall be free from rotating parts, which shall be compact and economic to manufacture and which shall be particularly, but not exclusively, suitable for use in aircraft.

It is a further object of the invention to provide an improved D.C.-A.C. inverter capable of providing a three-phase alternating current output.

According to the present invention, a D.C.-A.C. inverter comprises means for deriving two voltages or currents of similar square waveform phase displaced one with respect to the other, means for combining the two voltages or currents to produce a single pulse train alternate pulses of which are of opposite polarity with respect to a selected datum and the width of the individual pulses of which is a function of said phase displacement and means for deriving an alternating voltage or current from said pulse train.

Preferably, a source of voltage or current of square waveform is provided and the means for deriving the two phase displaced voltages or currents is responsive to the voltage or current of the source to provide such phase displaced voltages or currents.

Advantageously, the alternating voltage or current deriving means is a filter responsive to the single pulse train to derive an alternating voltage or current therefrom at least largely composed of the fundamental frequency of said single pulse train.

The invention also extends to a D.C.-A.C. inverter for producing a three-phase alternating current output comprising a source of voltage or current of square waveform, means for deriving therefrom three outputs phase displaced the second with respect to the first and the third with respect to the second by about 120°, and three separate alternating voltage or current producing means associated with each phase and each comprising means responsive to the associated phase of voltage or current of square waveform to derive two voltages or currents of similar square waveform phase displaced one with respect to the other, means for combining the two phase displaced voltages or currents to produce a single pulse train alternate pulses of which are of opposite polarity with respect to a selected datum and the width of the individual pulses of which is a function of the phase displacement of the two similar voltages or currents and means for deriving an alternating voltage or current from said single pulse train.

It will be understood that a voltage or current of square waveform is one which, alternately, for equal lengths of time, assumes one of two fixed values, the time of transition being negligible in comparison and minor departures from the ideal waveform being included in the definition.

One embodiment of the invention will now be described by way of example, reference being made to the accompanying drawings in which.

Figure 1:
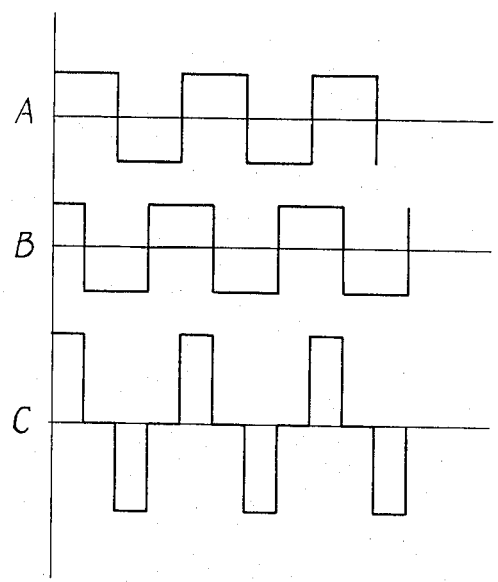
FIGS. 1A, 1B and 1C are waveform diagrams.

The D.C.-A.C. inverter of this invention operates on the principle that the addition of two similar square waves which are phase displaced relative to each other produces a train of pulses, alternate pulses of which are of opposite polarity with respect to a selected datum and the width of the individual pulses of which is a function of the phase displacement referred to. This is illustrated in FIG. 1 which FIGS. 1A and 1B illustrate two similar square waves which are phase displaced relative to each other and when added together produce the waveform illustrated in FIG. 1C which is a pulse train, the alternate pulses of which are of opposite polarity with respect to a selected datum and the width of the individual pulses of which is a function of the phase displacement of the square waves of FIGS. 1A and 1B. The waveform illustrated in FIG. 1C may be filtered to derive the fundamental thereof which is a sine wave having an amplitude which is a function of the width of the individual pulses and a frequency which is a function of the pulse repetition frequency of the square waves.

Figure 2:
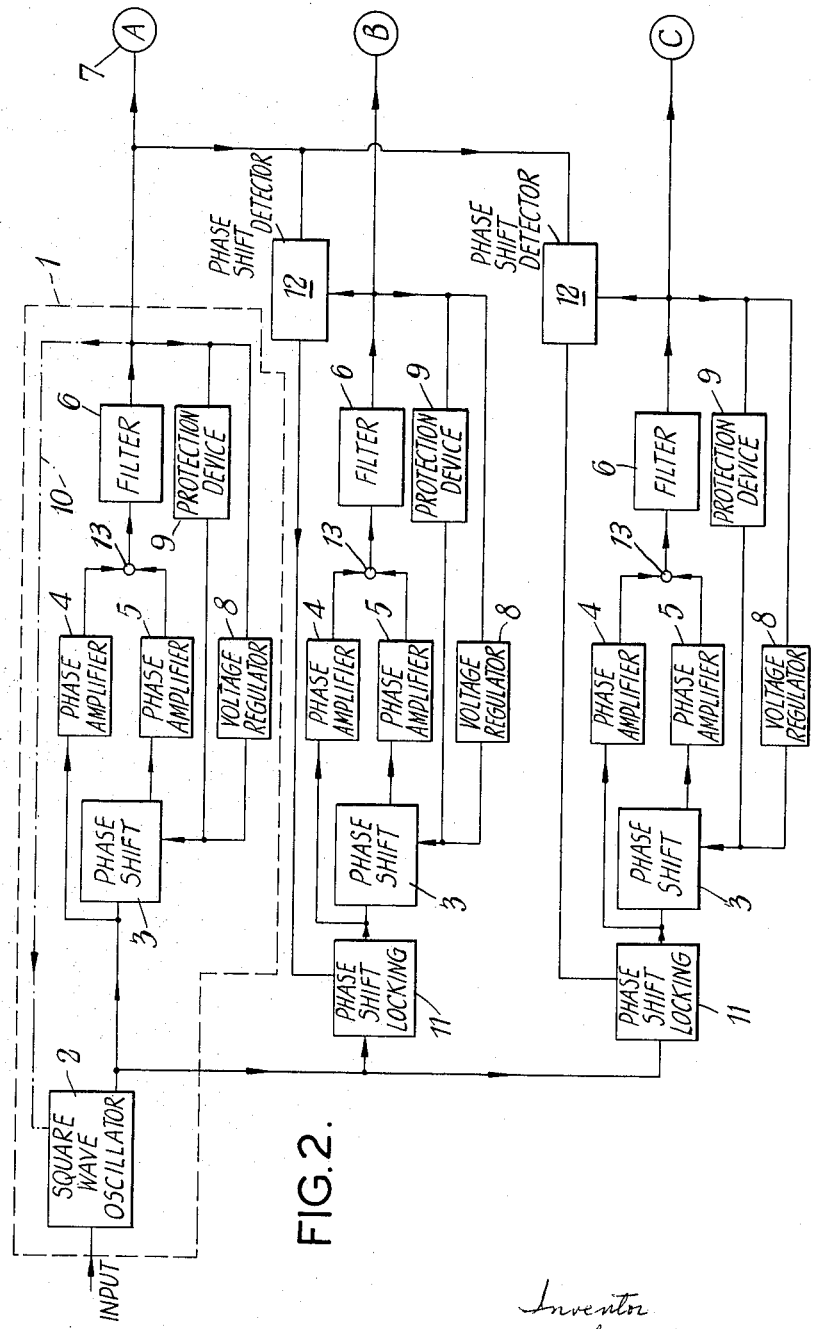
FIG. 2 is a block schematic diagram of a D.C.-A.C. inverter according to the invention whereby a three-phase output is obtained.

The D.C.-A.C. inverter illustrated in FIG. 2 for deriving a three-phase output will now be described, reference being first made to the units incorporated in the block 1 (referred to hereafter as a "phase-producing unit") which may be considered to be a D.C.-A.C. inverter for deriving a single phase output. This inverter comprises a D.C. controlled square wave oscillator 2 which produces voltage pulses of square waveform as illustrated in FIG. 1A and these are supplied to a phase shifting device 3 and to a first phase amplifier 4. The phase shifting device 3 produces a square wave voltage output such as illustrated in FIG. 1B which is phase displaced with respect to the waveform derived from the oscillator 2 and which is supplied to the second phase amplifier 5. The phase shifting device 3 may be any suitable device but, desirably, it is that described in our co-pending application Serial No. 147,307 dated October 24, 1961. The square waves derived from the phase amplifiers 4 and 5 are summed by means of a summing unit indicated at 13. This is conveniently achieved by incorporating transformers (not shown) in the outputs of the amplifiers 4 and 5, the secondary windings of which are connected in series. The summed output is a pulse train such as illustrated in FIG. 1C and is supplied to a filter network 6 which derives from the pulse train the fundamental thereof which is a sine wave having a frequency which is a function of the pulse repetition frequency of the output of the oscillator 2 and an amplitude which is a function of the width or so-called "firing-angle" of the pulses of the pulse train, and which may therefore be controlled by controlling the phase displacement produced by the device 3. The sine wave output is supplied to an output terminal 7. The output of the filter 6 is conveniently monitored by a voltage regulator 8 connected between this output and the phase shifting device 3 and which operates to sense any departure of the output voltage from the filter 6 from a predetermined value and to vary the phase shift introduced by the device 3 in the sense to oppose any such variation in the output voltage. Additionally, a protection device 9 is connected between the output of the filter 6 and phase shifting device 3 in order to respond to any undesired variation in the output of the filter 6 such as the load going on short circuit and operates to produce a phase-displacement of 180° in the square wave-forms to provide substantially zero input to the filter 6 when such undesired variation occurs.

It will be appreciated that the device 9 may be such as to respond to changes in frequency, current and/or voltage of the output of the filter 6 outside predetermined limits to change the phase displacement produced by the device 3 to substantially 180°. Alternatively the protection device 9 may be arranged to switch off the oscillator 2 as will be understood.

The output appearing at the terminal 7 is substantially a sine wave having a frequency which is a function of the pulse repetition frequency of the output of the oscillator 2 and an amplitude which is a function of the phase displacement produced by the device 3.

The phase amplifiers 4 and 5 advantageously incorporate silicon controlled rectifiers which are capable of handling high input voltage transients and of operating at high temperatures. Though such rectifiers are not readily controlled by variation of their conduction angle they are particularly suitable in the present apparatus where, in fact, they are used as switches and are either switched hard on by the applied square waveform or rendered non-conducting. The frequency of the output appearing at the terminal 7 may also be controlled by suitable means represented by the chain-dotted line 10 extending from the output of the filter 6 to the square wave oscillator 2 and operable to modify the pulse repetition frequency of the output of the oscillator 2 to oppose any change in frequency of the output of the filter 6 from a selected value.

In order to derive a three-phase output the single phase device described above is associated with two further phase-producing units similar to the phase-producing unit 1, the oscillator 2 being common to all three phase-producing units and like reference numerals being used to denote like parts. Each of these further phase-producing units however incorporates a phase shifting unit 11 connected between the oscillator 2 and the associated phase-shifting device 3 to phase displace the output of the oscillator 2 by 120° in the case of the second phase-producing unit and by 240° in the case of the third phase-producing unit. A phase shift detector 12 is connected to the output terminal 7 and the output of the associated filter 6 to compare the relative phases and to respond to any departure of the relative phases from 120° or 240° by controlling the associated phase shifting unit 11 in the sense to oppose any departure of the phase of the output of the phase-producing unit from its desired value.

In the second and third phase-producing units the frequency controlling means 10 is omitted.

It will be appreciated that the device described produces a three-phase output from a D.C. voltage which controls the square wave oscillator 2.

What I claim is:

1. A D.C. to A.C. inverter for producing three alternating electrical signals in three-phase relationship, the inverter including a square-wave oscillator the output of which is a first electrical square-wave, a first phase-shifting unit electrically connected to the output of said oscillator and arranged to derive a second electrical square-wave similar to said first electrical square-wave but substantially 120° phase-displaced thereto, a second phase-shifting unit electrically connected to the output of said oscillator and arranged to derive a third electrical square-wave similar to said first electrical square-wave but substantially 240° phase-displaced thereto, in combination with, for each of the first, second and third electrical square-waves, a separate phase-shifting device arranged to receive that square-wave and to derive an auxiliary electrical square-wave similar to that square-wave but having a relative phase displacement thereto, and a separate summing unit for adding together that square-wave and the corresponding auxiliary square-wave to produce a corresponding pulse train.

2. An inverter as claimed in claim 1 which includes, for each of the first, second and third electrical square-waves, a separate filter electrically connected to the output of the corresponding summing unit, and arranged to filter said corresponding pulse train to derive one of said three alternating electrical signals.

3. A D.C. to A.C. inverter for producing three alternating electrical signals in three-phase relationship, the inverter including a square-wave oscillator the output of which is a first electrical square-wave, a first phase-shifting unit electrically connected to the output of said oscillator and arranged to derive a second electrical square-wave similar to said first electrical square-wave but substantially 120° phase-displaced thereto, a second phase-shifting unit electrically connected to the output of said oscillator and arranged to derive a third electrical square-wave similar to said first electrical square-wave but substantially 240° phase-displaced thereto, in combination with, for each of the first, second and third electrical square-waves, a separate phase-shifting device arranged to receive that square-wave and to derive an auxiliary electrical square-wave similar to that square-wave but having a relative phase displacement thereto, and a separate summing unit for adding together that square-wave and the corresponding auxiliary square-wave to produce a corresponding pulse train, in combination with, for each of the first, second and third electrical square-waves, a separate filter electrically connected to the output of the corresponding summing unit, and arranged to filter said corresponding pulse train to derive one of said three alternating electrical signals, and in combination with a phase-shift detector arranged to compare the relative phases of two of said three alternating electrical signals and to control that one of said phase-shifting units, which is associated with one of said two electrical signals, in the sense to tend to maintain said relative phases in a predetermined relationship.

References Cited by the Examiner

UNITED STATES PATENTS

| | | | |
|---|---|---|---|
| 2,567,410 | 9/1951 | Trousdale | 331—45 |
| 2,668,938 | 2/1954 | Henrich | 321—54 X |
| 2,798,970 | 7/1957 | Hall et al. | 332—12 X |
| 2,916,687 | 12/1959 | Cronin | 331—45 X |
| 3,024,373 | 3/1962 | Seike | 321—5 X |
| 3,125,726 | 3/1964 | Clifton | 332—12 |

JOHN F. COUCH, *Primary Examiner.*

LLOYD McCOLLUM, MILTON O. HIRSHFIELD, *Examiners.*

A. J. GAJARSA, M. WACHTELL, *Assistant Examiners.*